United States Patent
Lu et al.

(10) Patent No.: US 11,417,458 B2
(45) Date of Patent: Aug. 16, 2022

(54) MAGNETIC COMPONENT AND SWITCH POWER SUPPLY DEVICE

(71) Applicant: Delta Electronics, Inc., Taoyuan (TW)

(72) Inventors: Zengyi Lu, Taoyuan (TW); Tianding Hong, Taoyuan (TW); Haijun Yang, Taoyuan (TW); Jinfa Zhang, Taoyuan (TW)

(73) Assignee: Delta Electronics, Inc., Taoyuan (TW)

( * ) Notice: Subject to any disclaimer, the term of this patent is extended or adjusted under 35 U.S.C. 154(b) by 776 days.

(21) Appl. No.: 16/197,385

(22) Filed: Nov. 21, 2018

(65) Prior Publication Data
US 2019/0362885 A1    Nov. 28, 2019

(30) Foreign Application Priority Data
May 28, 2018 (CN) .......................... 201810522699.6

(51) Int. Cl.
*H01F 27/28* (2006.01)
*H01F 27/32* (2006.01)
(Continued)

(52) U.S. Cl.
CPC ............. *H01F 27/32* (2013.01); *H01F 27/24* (2013.01); *H01F 27/2823* (2013.01);
(Continued)

(58) Field of Classification Search
CPC ...... H01F 27/32; H01F 27/24; H01F 27/2823; H01F 27/29; H01F 38/00;
(Continued)

(56) References Cited

U.S. PATENT DOCUMENTS 4,488,136 A * 12/1984 Hansen .................... H01F 27/24
336/215
8,339,808 B2 * 12/2012 Nakahori ................. H02M 1/40
363/17

(Continued)

FOREIGN PATENT DOCUMENTS

CN            2727925 Y      9/2005
CN          101305513 A     11/2008
(Continued)

*Primary Examiner* — Mang Tin Bik Lian
*Assistant Examiner* — Mangtin Lian
(74) *Attorney, Agent, or Firm* — CKC & Partners Co., LLC

(57) ABSTRACT

A magnetic component and a switch power supply device are disclosed. The magnetic component includes a magnetic core and at least three windings, the magnetic core including at least three winding columns, at least one side columns, a first cover plate and a second cover plate opposite to each other, wherein the at least three winding columns are sequentially arranged in adjacent, the first cover plate and the second cover plate are respectively at upper parts or lower parts of the at least three winding columns and the at least one side column to form a closed magnetic flux loop; the at least three windings are wound on the at least three winding columns, respectively; wherein magnetic flux direction of the middle winding column in adjacent three winding columns is opposite to magnetic fluxes direction of the other two winding columns in adjacent three winding columns.

8 Claims, 12 Drawing Sheets

(51) Int. Cl.
*H01F 27/24* (2006.01)
*H01F 27/29* (2006.01)
*H02M 1/00* (2006.01)
*H02M 3/335* (2006.01)
*H01F 38/00* (2006.01)

(52) U.S. Cl.
CPC ............. *H01F 27/29* (2013.01); *H01F 38/00* (2013.01); *H02M 1/0064* (2021.05); *H02M 1/0074* (2021.05); *H02M 3/33569* (2013.01); *H02M 3/33576* (2013.01)

(58) Field of Classification Search
CPC .... H01F 2038/006; H01F 27/28; H01F 27/40; H01F 2027/408; H02M 1/0064; H02M 1/0074; H02M 3/33569; H02M 3/33576; H02M 3/285
See application file for complete search history.

(56) References Cited

U.S. PATENT DOCUMENTS

| | | | |
|---|---|---|---|
| 2009/0231885 A1* | 9/2009 | Won | H01F 27/38 336/212 |
| 2010/0232181 A1* | 9/2010 | Nakahori | H01F 27/2804 336/221 |
| 2014/0043127 A1* | 2/2014 | Worek | H01F 27/38 336/178 |
| 2014/0241012 A1* | 8/2014 | Lindberg-Poulsen | H02M 3/33523 363/17 |
| 2017/0047156 A1* | 2/2017 | Sakamoto | H01F 27/22 |
| 2017/0345541 A1 | 11/2017 | Yang et al. | |
| 2017/0345756 A1 | 11/2017 | Yin et al. | |
| 2018/0138801 A1* | 5/2018 | Chen | H01F 3/10 |
| 2018/0226182 A1* | 8/2018 | Fe | H02M 3/33523 |
| 2019/0110355 A1 | 4/2019 | Sato et al. | |

FOREIGN PATENT DOCUMENTS

| | | |
|---|---|---|
| CN | 101840769 B | 8/2012 |
| CN | 103595367 A | 2/2014 |
| CN | 103782355 B | 8/2016 |
| CN | 106057402 A | 10/2016 |
| CN | 106057433 A | 10/2016 |
| CN | 205693566 U | 11/2016 |
| CN | 106252041 A | 12/2016 |
| CN | 103595367 B | 3/2017 |
| CN | 206481223 U | 9/2017 |
| CN | 107437456 A | 12/2017 |
| CN | 107437885 A | 12/2017 |
| CN | 208433282 U | 1/2019 |
| EP | 3054593 A1 | 8/2016 |
| JP | S5246433 A | 4/1977 |
| JP | H08227815 A | 9/1996 |
| JP | 2012054484 A | 3/2012 |
| JP | 2018074146 A | 5/2018 |
| TW | 201421498 A | 6/2014 |
| WO | 2017188246 A1 | 11/2017 |

* cited by examiner

MAGNETIC COMPONENT AND SWITCH POWER SUPPLY DEVICE

CROSS REFERENCE

The present application is based upon and claims priority to Chinese Patent Application No. 201810522699.6, filed on May 28, 2018, and the entire contents thereof are incorporated herein by reference.

TECHNICAL FIELD

The present disclosure relates to a magnetic component and a switch power supply device.

BACKGROUND

In application of low voltage and large current output, it requires to design the transformer in array, and divide it into a plurality of sub-transformer units for combination. For example, in a 3 kW server power supply with an input voltage 430V and an output voltage 12V, a turn ratio of primary and secondary sides ($N_p:N_{s1}:N_{s2}$) of the transformer of the LLC resonant circuit is 18:1:1, which can be divided into three sub-transformers of 6:1:1 having primary windings connected in series, and secondary windings connected in parallel. In such way, the same current flows through the primary windings, and the secondary windings are connected in parallel to form a tripled current output. The structure of the plurality of sub-transformers can have an effect of parallelizing transmission power, but the plurality of sub-transformers are designed discretely and complicated in structure. The key and difficult point of designing and developing the magnetic component is always how to optimize shape of the magnetic core, reduce size and loss of the magnetic core.

SUMMARY

An aspect of the present disclosure is to overcome the deficiency of the prior art, and provides a magnetic component with small size and low loss.

Another aspect of the present disclosure is to provide a switch power supply device, and optimize design of the magnetic component therein.

In order to achieve the above object, the present disclosure provides a magnetic component including a magnetic core, the magnetic core includes a first winding column, a second winding column, a third winding column, a first side column, a second side column, and a first cover plate and a second cover plate which are disposed opposite to each other, wherein the second winding column is disposed between the first winding column and the third winding column, the first side column and the second side column are disposed respectively outside the first winding column and the third winding column, the first cover plate and the second cover plate are disposed respectively above and below the first winding column, the second winding column, the third winding column, the first side column and the second side column to form a closed magnetic flux loop; wherein a magnetic flux of the first winding column and a magnetic flux of the third winding column have a first direction, and a magnetic flux of the second winding column has a second direction opposite to the first direction; in a plane where the magnetic core is located, a straight line contacts with or penetrates through the first winding column, and the common straight line also contacts with or penetrates through the second winding column, and the common straight line also contacts with or penetrates through the third winding column.

In order to achieve the above object, the present disclosure further provides a magnetic component, including: a magnetic core including at least one side column, a first cover plate and a second cover plate which are disposed opposite to each other, wherein at least three winding columns are sequentially arranged, the first cover plate and the second cover plate are disposed respectively above and below the at least three winding columns and the at least one side column to form a closed magnetic flux loop; and at least three windings wound on the at least three winding columns, respectively; wherein magnetic flux direction of the middle winding column in adjacent three winding columns is opposite to magnetic fluxes direction of the other two winding columns in adjacent three winding columns.

In order to achieve the above object, the present disclosure further provides a switch power supply device having a magnetic component as described above, including:

a primary circuit for receiving an input voltage, and converting the input voltage into a primary voltage;

an isolation conversion module for converting the primary voltage into a secondary voltage, and including: a first transformer including a first primary winding, a first secondary winding and a second secondary winding; a second transformer including a second primary winding, a third secondary winding and a fourth secondary winding; and a third transformer including a third primary winding, a fifth secondary winding and a sixth secondary winding;

a secondary circuit for converting the secondary voltage into an output voltage;

wherein the first primary winding, the first secondary winding and the second secondary winding are wound on the first winding column, the second primary winding, the third secondary winding and the fourth secondary winding are wound on the second winding column, and the third primary winding, the fifth secondary winding and the sixth secondary winding are wound on the third winding column.

By integrating multiple inductors or transformers into the same magnetic component, magnetic flux direction of the middle winding column in adjacent three winding columns is opposite to magnetic fluxes direction of the other two winding columns in adjacent three winding columns, the present disclosure can effectively reduce the size and loss of the magnetic component.

Additional aspects and advantages of the present disclosure will be partially explained below, and will become partially apparent from the explanation, or may be obtained from practice of the present disclosure.

BRIEF DESCRIPTION OF THE DRAWINGS

Other features and advantages of the present disclosure will become more apparent by explicitly describing exemplary embodiments with reference to the drawings.

DETAILED DESCRIPTION

Figure 1A:
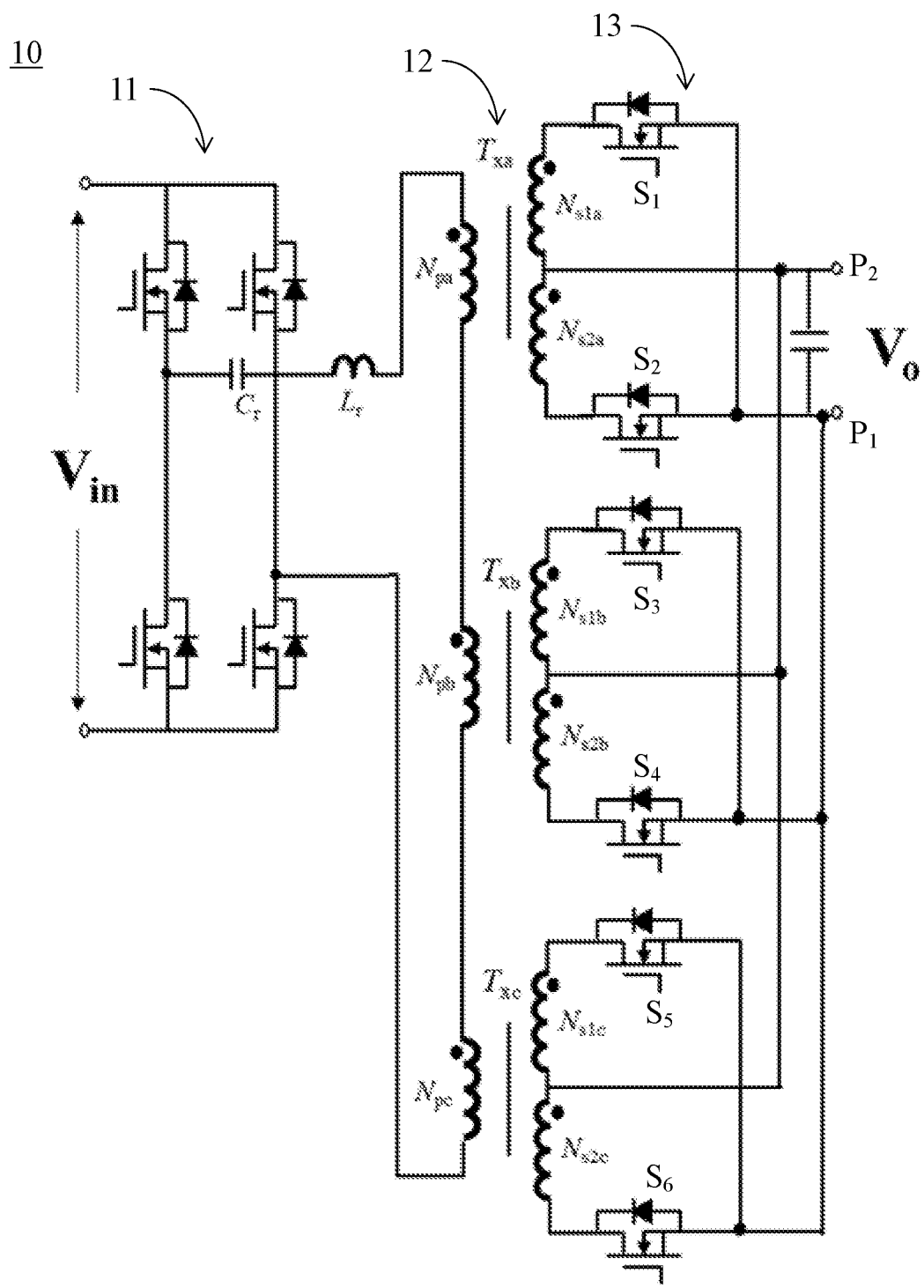
FIG. 1A illustrates a structure diagram of a switch power supply device in one embodiment of the present disclosure, wherein primary windings of a plurality of transformers in an isolation conversion module of the switch power supply device are in a manner of being directly connected in series.

Now exemplary embodiments are fully described with reference to the drawings. However, the exemplary embodiments can be implemented in various forms, and shall not be understood as a limit to the embodiments described here. On the contrary, these embodiments are provided to allow the present disclosure to be comprehensive and complete, and concept of the exemplary embodiments is fully conveyed to one skilled in the art. The same reference signs in the drawings represent the same or similar structure, so the detailed explanations are omitted.

When elements/components/the like described and/or illustrated here are introduced, expressions of "one", "first", "the", and "at least one" are used to represent one or more elements/components/the like. The terms "include", "include" and "have" are used to represent an open meaning of including, and refer to that except the listed elements/components/the like, additional elements/components/the like also may exist. The embodiments may use relative expressions, such as, "upper" or "lower", to describe a relative relationship of one assembly relative to another assembly. It can be understood that if the illustrated device reverses to turn upside down, the assembly on an "upper" side will become an assembly on a "lower" side. In addition, the terms "first", "second" and the like in the claims are only used as signs, and do not limit the number of objects.

As for "electrically couple" used in the text, it may refer to that two or more components are directly physically or electrically contacted, or are indirectly physically or electrically contacted. As for "electrically couple in series" used in the text, it may refer to that two or more components are directly connected in series to be physically or electrically contacted, or are indirectly connected in series to be physically or electrically contacted, and "electrically couple in parallel" may refer to that two or more components are directly connected in parallel to be physically or electrically contacted, or are indirectly connected in parallel to be physically or electrically contacted.

Please refer to FIG. 1A, which illustrates a switch power supply device 10 of the present disclosure. The switch power supply device 10 includes a primary circuit 11, an isolation conversion module 12 and a secondary circuit 13.

The primary circuit 11 receives an input voltage $V_{in}$, and converts the input voltage $V_{in}$ into a primary voltage. A circuit topology of the primary circuit 11 may be a half-bridge, and also may be a full-bridge or other topology.

The isolation conversion module 12 converts the primary voltage into a secondary voltage, and may includes a first transformer $T_{xa}$, a second transformer $T_{xb}$ and a third transformer $T_{xc}$. The transformer $T_{xa}$ includes a first primary winding $N_{pa}$, a first secondary winding $N_{s1a}$ and a second secondary winding $N_{s2a}$, and a first end of the first primary winding $N_{pa}$ is electrically coupled to one end of the primary circuit 11; the second transformer $T_{xb}$ includes a second primary winding $N_{pb}$, a third secondary winding $N_{s1b}$ and a fourth secondary winding $N_{s2b}$, and a first end of the second primary winding $N_{pb}$ is electrically coupled to a second end of the first primary winding $N_{pa}$; the third transformer $T_{xc}$ includes a third primary winding $N_{pc}$, a fifth secondary winding $N_{s1c}$ d a sixth secondary winding $N_{s2c}$, a first end of the third primary winding $N_{pc}$ is electrically coupled to a second end of the second primary winding $N_{pb}$, and a second end of the third primary winding $N_{pc}$ is electrically coupled to the other end of the primary circuit 11.

The secondary circuit 13 converts the secondary voltage into an output voltage $V_o$.

For example, in the embodiment shown in FIG. 1A, the first secondary winding $N_{s1a}$ is connected to the second secondary winding $N_{s2a}$ in series, a first end of the first secondary winding $N_{s1a}$ is electrically coupled to a first output terminal $P_1$ via a first switch transistor $S_1$, a second end of the second secondary winding $N_{s2a}$ is electrically coupled to the first output terminal $P_1$ via a second switch transistor $S_2$, and a second end of the first secondary winding $N_{s1a}$ and a first end of the second secondary winding $N_{s2a}$ are connected and electrically coupled to a second output terminal $P_2$.

The third secondary winding $N_{s1b}$ is connected to the fourth secondary winding $N_{s2b}$ in series, a first end of the third secondary winding $N_{s1b}$ is electrically coupled to the first output terminal $P_1$ via a third switch transistor $S_3$, a second end of the fourth secondary winding $N_{s2b}$ is electrically coupled to the first output terminal $P_1$ via a fourth switch transistor $S_4$, and a second end of the third secondary winding $N_{s1b}$ and a first end of the fourth secondary winding $N_{s2b}$ are connected and electrically coupled to the second output terminal $P_2$.

The fifth secondary winding $N_{s1c}$ is connected to the sixth secondary winding $N_{s2c}$ in series, a first end of the fifth secondary winding $N_{s1c}$ is electrically coupled to the first output terminal $P_1$ via a fifth switch transistor $S_5$, a second end of the sixth secondary winding $N_{s2}$ is electrically coupled to the first output terminal $P_1$ via a sixth switch transistor $S_6$, and a second end of the fifth secondary winding $N_{s1c}$ and a first end of the sixth secondary winding $N_{s2}$ are connected and electrically coupled to the second output terminal $P_2$.

Figure 1B:
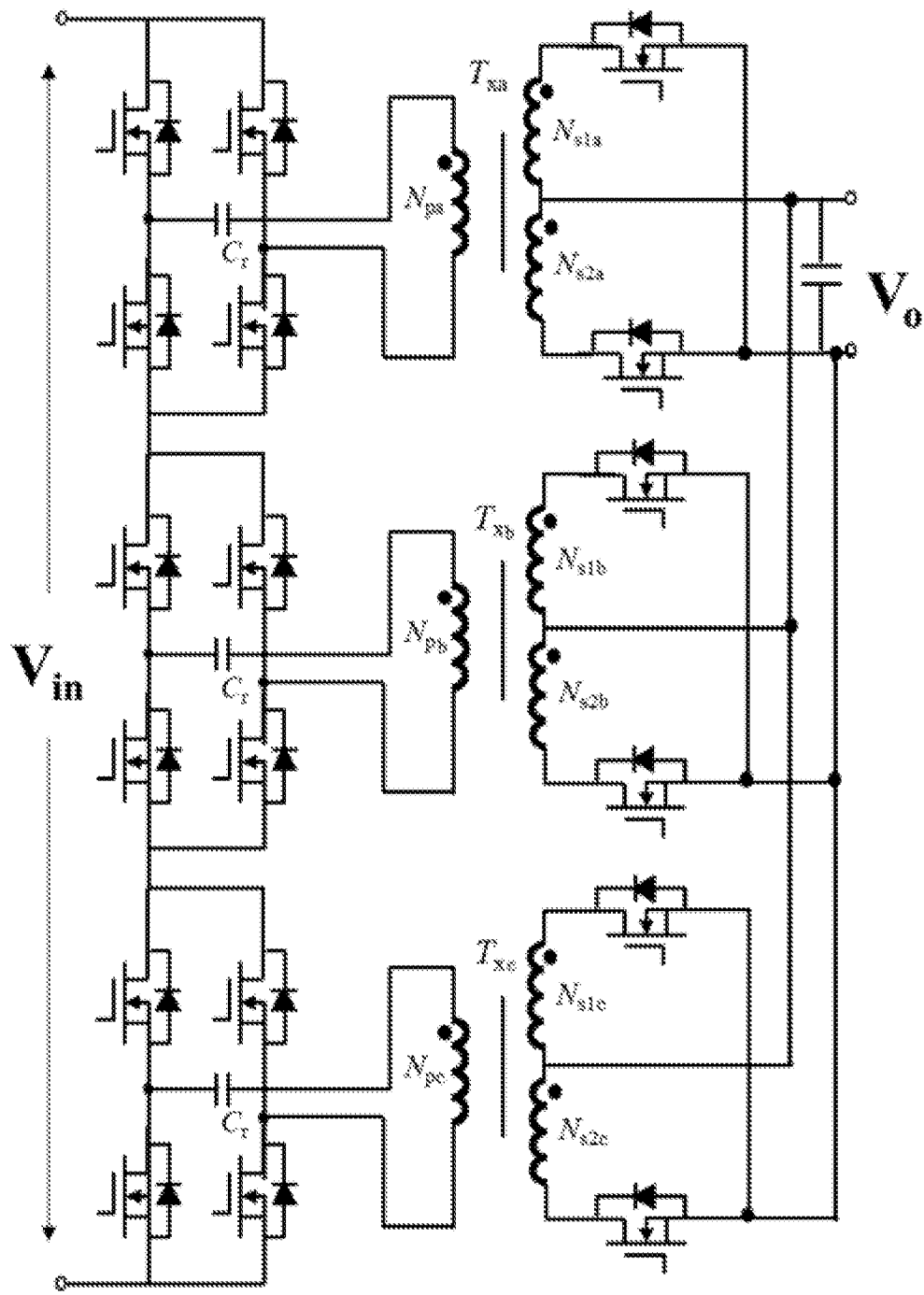
FIG. 1B illustrates a structure diagram of a switch power supply device in another embodiment of the present disclosure, wherein primary windings of a plurality of transformers in an isolation conversion module of the switch power supply device are in a manner of being indirectly coupled in series.
Figure 1C:
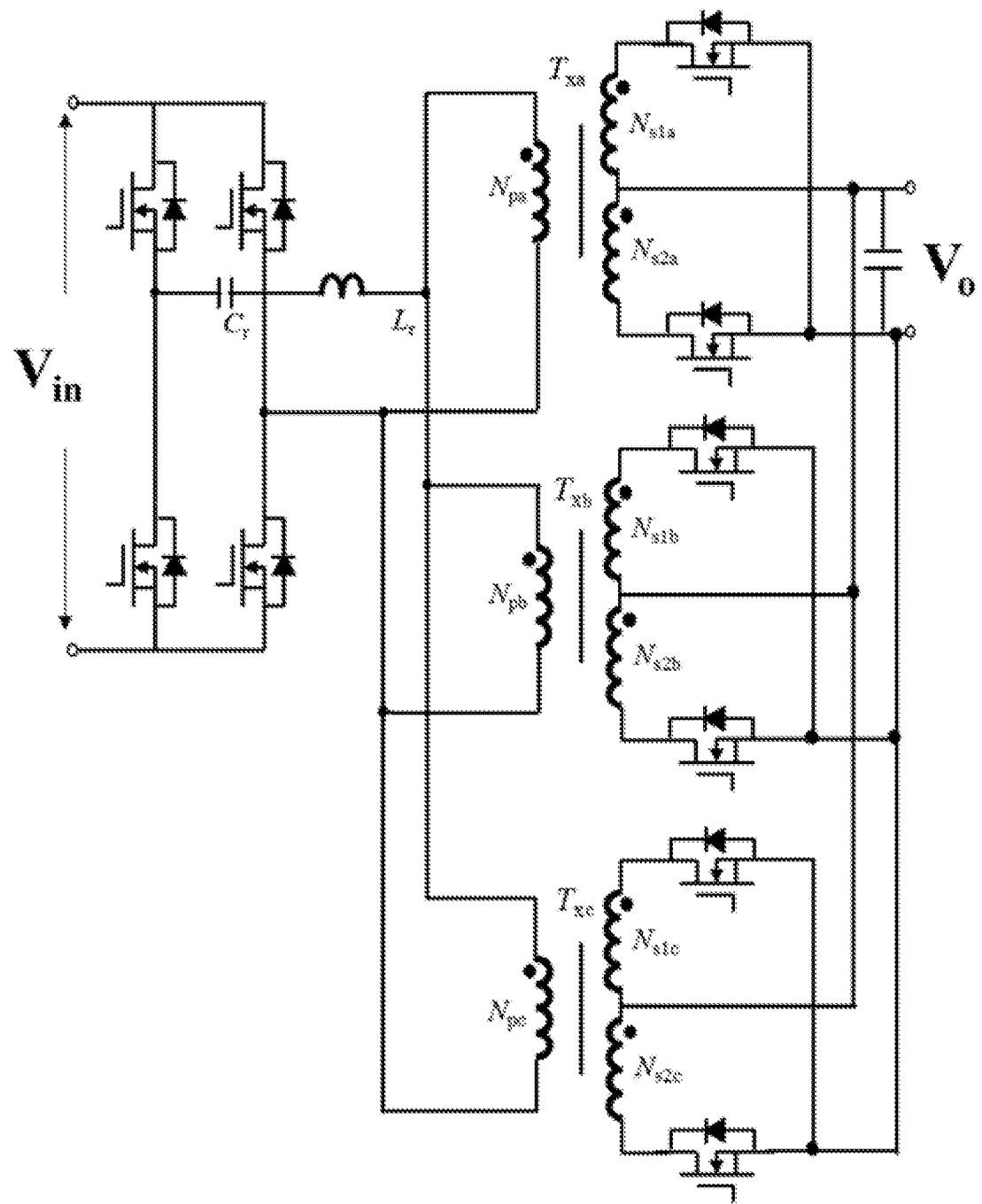
FIG. 1C illustrates a structure diagram of a switch power supply device in another embodiment of the present disclosure, wherein primary windings of a plurality of transformers in an isolation conversion module of the switch power supply device are in a manner of being directly connected in parallel.
Figure 1D:
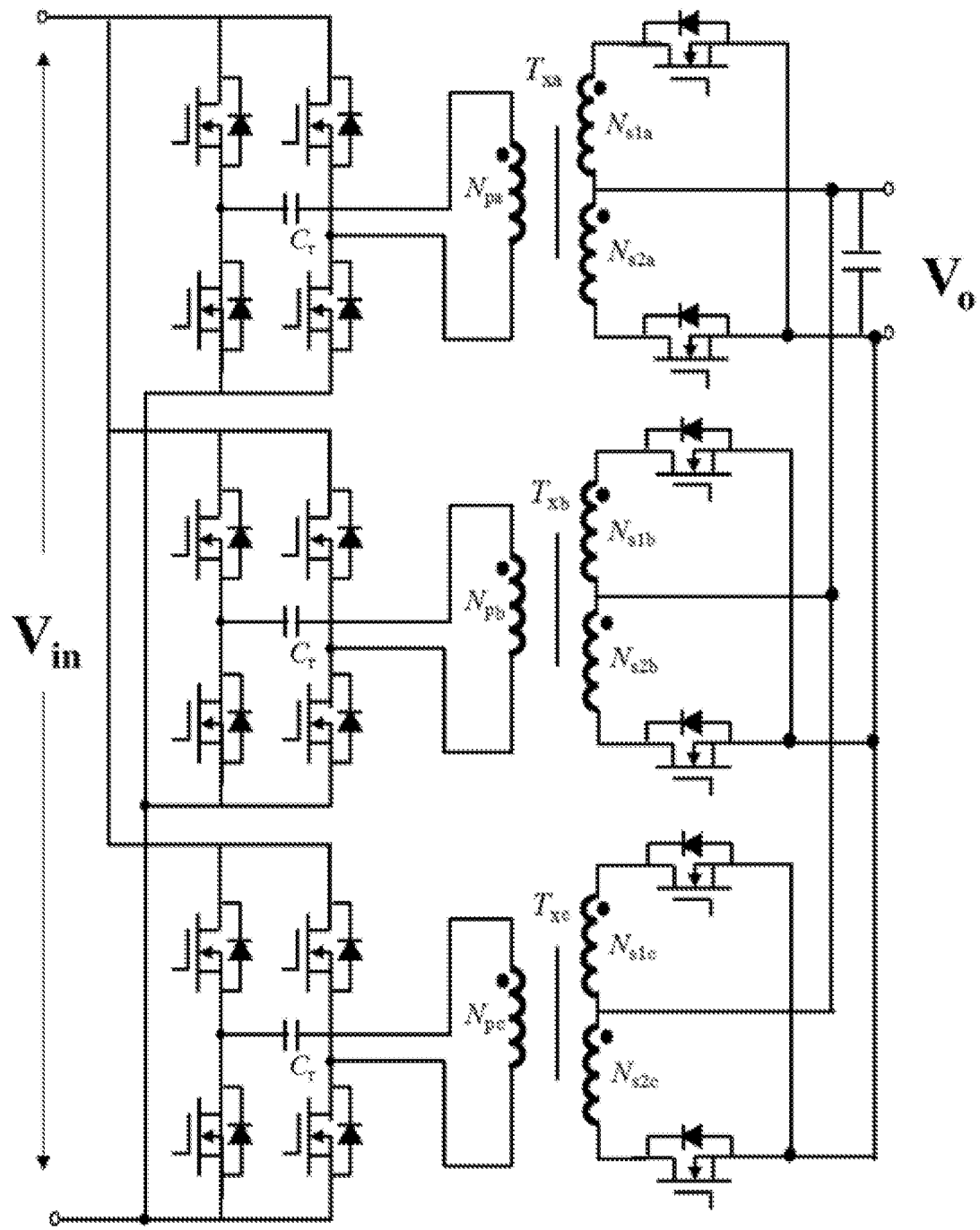
FIG. 1D illustrates a structure diagram of a switch power supply device in another embodiment of the present disclosure, wherein primary windings of a plurality of transformers in an isolation conversion module of the switch power supply device are in a manner of being indirectly coupled in parallel.

However, it can be understood that a connection manner of the first primary winding $N_{pa}$, the second primary winding $N_{pb}$ and the third primary winding $N_{pc}$ in the present disclosure may be directly connected in series, as shown in FIG. 1A; also may be indirectly coupled in series, as shown in FIG. 1B; also may be directly connected in parallel, as shown in FIG. 1C; also may be indirectly coupled in parallel, as shown in FIG. 1D. These connection manners are not used as a limit to the present disclosure.

Furthermore, it can be understood that the circuit topology of the input terminal is not limited to the half-bridge or full-bridge shown in the drawings, and also may be other circuit structure. The circuit topology of the output terminal may not be limited to half-wave rectification shown in the drawings, and also may be other manners such as full-wave rectification. In addition, the switch power supply device of the present disclosure may receive an input voltage, for example, an input voltage $V_{in}$ in a range from 300V to 450V, preferably, for example, an input voltage $V_{in}$ in a range from 410V to 450V. Furthermore, the switch power supply device of the present disclosure may also receive an input voltage, for example, an input voltage $V_{in}$ in a range from 36V to 72V. They are also not used as a limit to the present disclosure.

The magnetic component of the present disclosure is introduced below.

Figure 2:
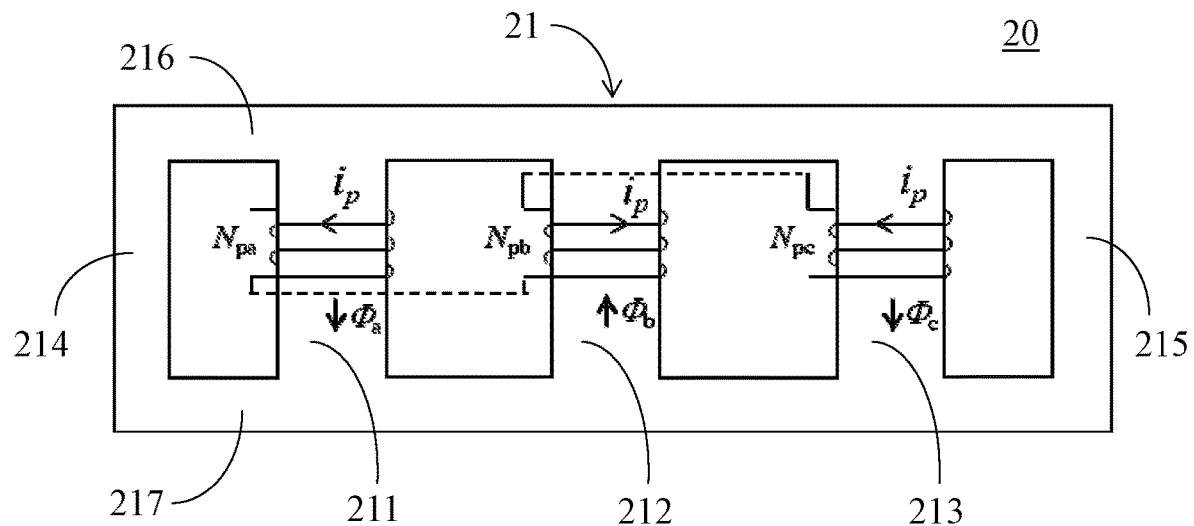
FIG. 2 illustrates a connection diagram of windings of the plurality of transformers in the isolation conversion module of the switch power supply device shown in FIG. 1A.

Please refer to FIG. 2, which is a magnetic component in one embodiment of the present disclosure, and illustrates, for example, a schematic diagram of structure of an array transformer 20 consisting of a plurality of transformers of the isolation conversion module 12 and connection of windings thereof in the switch power supply device shown in FIG. 1A. In this embodiment, the transformer 20 includes a magnetic core 21, and the magnetic core 21 includes a first winding column 211, a second winding column 212, a third winding column 213, a first side column 214, a second side column 215, a first cover plate 216 and a second cover plate 217 opposite to each other. The second winding column 212 is between the first winding column 211 and the third winding column 213, the first side column 214 and the second side column 215 are respectively outside the first winding column 211 and the third winding column 213, and the first cover plate 216 and the second cover plate 217 are disposed respectively above and below the first winding column 211, the second winding column 212, the third winding column 213, the first side column 214 and the second side column 215 to form a closed magnetic flux loop. A magnetic flux $\Phi_a$ of the first winding column 211 and a magnetic flux $\Phi_c$ of the third winding column 213 have a first direction, and a magnetic flux $\Phi_b$ of the second winding column 212 has a second direction opposite to the first direction. For example, in FIG. 2, the winding $N_{pa}$, the winding $N_{pb}$ and the winding $N_{pc}$ are connected in series, when a current $i_p$ flows through the windings, the magnetic flux $\Phi_a$ of the first winding column 211 and the magnetic flux $\Phi_c$ the third winding column 213 have the same direction, which is shown downwardly in the drawing, and is opposite to the direction of the magnetic flux $\Phi_b$ of the second winding column 212, which is shown upwardly in the drawing.

Referring to FIG. 1A, the first primary winding $N_{pa}$, the first secondary winding $N_{s1a}$ and the second secondary winding $N_{s2a}$ are wound on the first winding column 211 to form the first transformer $T_{xa}$, the second primary winding $N_{pb}$, the third secondary winding $N_{s1b}$ and the fourth secondary winding $N_{s2b}$ are wound on the second winding column 212 to form the second transformer $T_{xb}$, and the third primary winding $N_{pc}$, the fifth secondary winding $N_{s1c}$ and the sixth secondary winding $N_{s2c}$ are wound on the third winding column 213 to form the third transformer $T_{xc}$. Moreover, the first primary winding $N_{pa}$, the second primary winding $N_{pb}$ and the third primary winding $N_p$ are connected in series. Preferably, currents flowing through the first primary winding $N_{pa}$, the second primary winding $N_{pb}$ and the third primary winding $N_{pc}$ have the same magnitude and phase. FIG. 2 does not show the secondary windings. In other embodiments, the winding columns also may not have secondary windings, and it is used as an inductor.

As compared to three discrete transformers, a size of the magnetic core may be effectively reduced by integrating the three transformers into the same magnetic component. Moreover, loss of the magnetic core may be effectively reduced by configuring that magnetic flux direction of the middle winding column in adjacent three winding columns is opposite to magnetic fluxes direction of the other two winding columns in adjacent three winding columns.

According to the embodiment of the present disclosure, the first primary winding $N_{pa}$, the second primary winding $N_{pb}$ and the third primary winding $N_{pc}$, for example, may be PCB windings or triple insulated wire windings. Preferably, the number of turns of the primary windings is the same.

According to the embodiment of the present disclosure, the first secondary winding $N_{s1a}$, the second secondary winding $N_{s2a}$, the third secondary winding $N_{s1b}$, the fourth secondary winding $N_{s2b}$, the fifth secondary winding $N_{s1c}$ and the sixth secondary winding $N_{s2c}$, for example, may be PCB windings or copper sheet windings. Preferably, the number of turns of each secondary winding may be, for example, one.

Figure 3A:
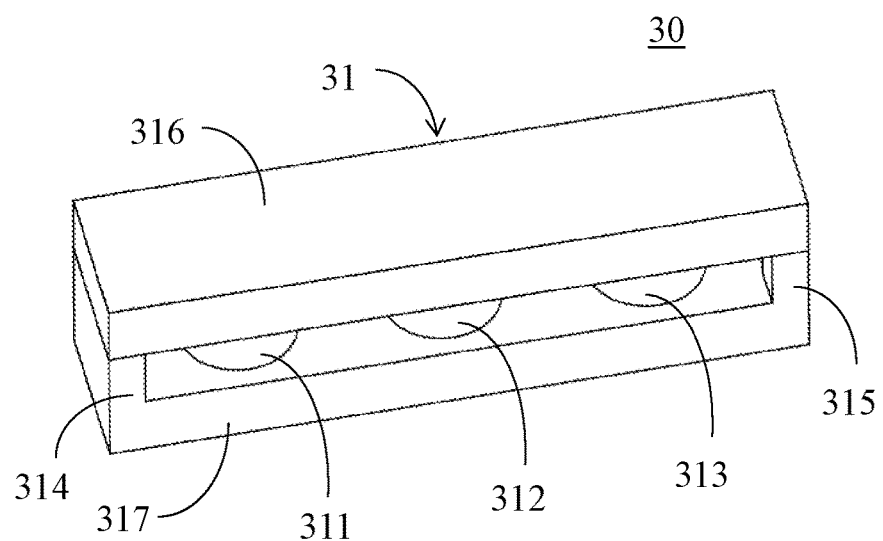
FIG. 3A illustrates a stereoscopic assembly diagram of the first magnetic core structure of the magnetic component of the present disclosure, wherein the magnetic core structure includes a first winding column, a second winding column, a third winding column, a first side column, a second side column, a first cover plate and a second cover plate.
Figure 3B:
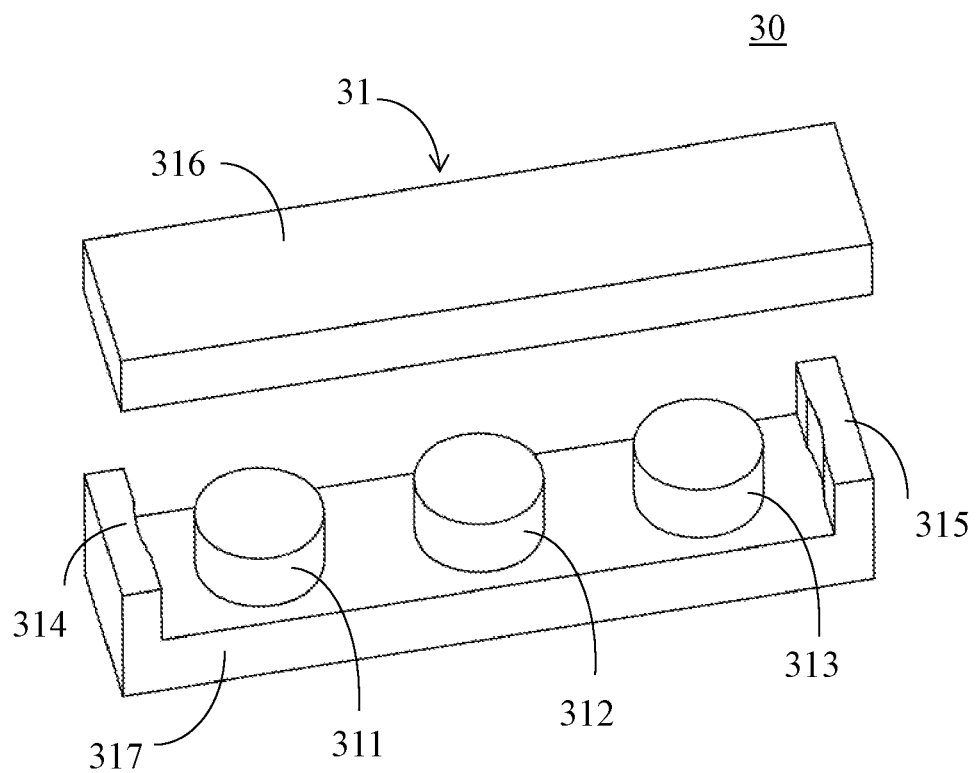
FIG. 3B illustrates a stereoscopic exploded diagram of the magnetic core structure shown in FIG. 3A.

Referring to FIGS. 3A-3G, FIG. 3A is a stereoscopic structure diagram of the first magnetic core structure in the present disclosure, and FIG. 3B illustrates an exploded diagram of the magnetic core structure shown in FIG. 3A. As shown in FIGS. 3A-3B, a magnetic core structure 30 of the present disclosure includes a magnetic core 31, besides including a first winding column 311, a second winding column 312, a third winding column 313, a first side column 314 and a second side column 315, it further includes a first cover plate 316 and a second cover plate 317 opposite to each other. The first cover plate 316 and the second cover plate 317 are disposed respectively above and below the first winding column 311, the second winding column 312, the third winding column 313, the first side column 314 and the second side column 315 to form a closed magnetic flux loop.

Figure 3C:
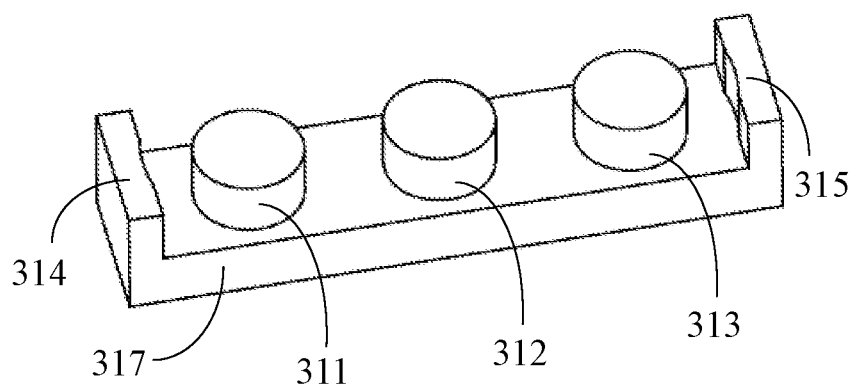
FIG. 3C illustrates a stereoscopic diagram of the magnetic core structure without the first cover plate shown in FIG. 3A.
Figure 3D:
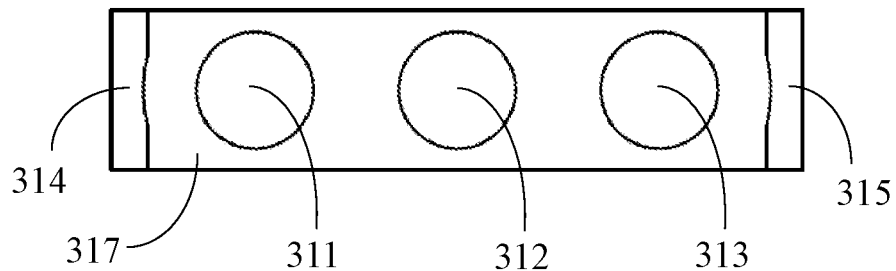
FIG. 3D illustrates a top view of the magnetic core structure shown in FIG. 3C.

In order to clearly show the three winding columns and the two side columns, FIG. 3C illustrates a stereoscopic structure diagram of the magnetic core structure after omitting the first cover plate shown in FIG. 3A, and FIG. 3D illustrates a top view of the magnetic core structure shown in FIG. 3C. Preferably, the three winding columns, such as, the first winding column 311, the second winding column 312 and the third winding column 313, of the magnetic core structure are sequentially arranged along a horizontal line, and the first side column 314 and the second side column 315 are disposed on both ends of the horizontal line, respectively. However, according to other embodiment of the present disclosure, the magnetic core structure 30 also may only include a single side column which is on one side of the horizontal line.

Figure 3E:
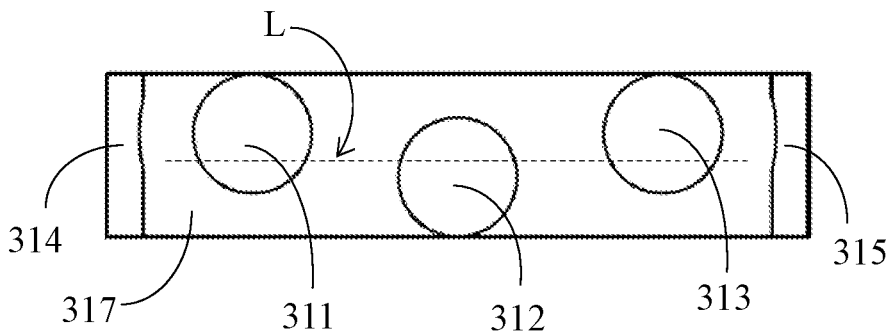
FIG. 3E illustrates a top view of the second magnetic core structure of the magnetic component of the present disclosure, wherein in a plane where the magnetic core is located, a common straight line can contact or penetrate through the three winding columns simultaneously.

FIG. 3E illustrates a top view of the second magnetic core structure of the present disclosure, and it differs from the magnetic core structure shown in FIG. 3D in that the first winding column 311, the second winding column 312 and the third winding column 313 are dislocated at a certain level in relative positions, and a straight line can contact or penetrate through the first winding column 311, and the common straight line also contacts with or penetrates through the second winding column 312, and the common straight line also contacts with or penetrates through the third winding column 313, as shown by an imaginary line L in the drawing.

Figure 3F:
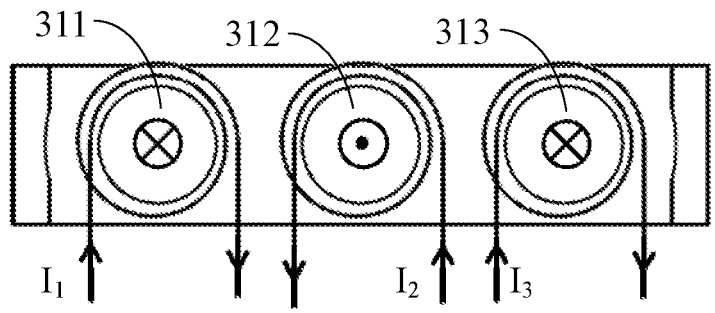
FIG. 3F illustrates current directions corresponding to the three winding columns in the magnetic core structure shown in FIG. 3D.

FIG. 3F illustrates current directions of the windings of the magnetic core structure shown in FIG. 3D, wherein current directions $I_1$ and $I_3$ of the first winding column 311 and the third winding column 313 are clockwise directions, and a current direction $I_2$ of the second winding column 312 is an counterclockwise direction.

Figure 3G:
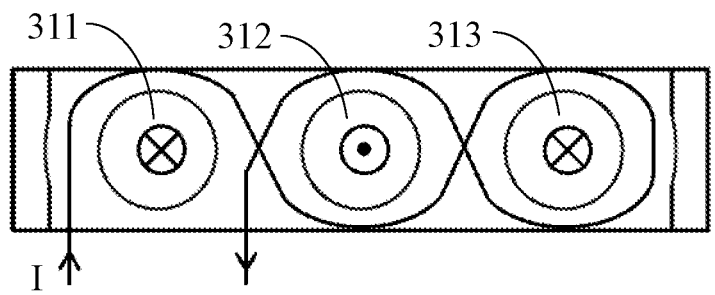
FIG. 3G illustrates a schematic diagram in which the magnetic core structure shown in FIG. 3D can be connected in a "∞" shape by one winding.

FIG. 3G illustrates that the primary winding of the magnetic core structure shown in FIG. 3D can be formed of only one winding which is wound in a "∞shape". A current direction I of the winding surrounding the first winding column 311 and the third winding column 313 is a clockwise direction, and a current direction I of the winding surrounding the second winding column 312 is an counterclockwise direction.

Figure 4A:
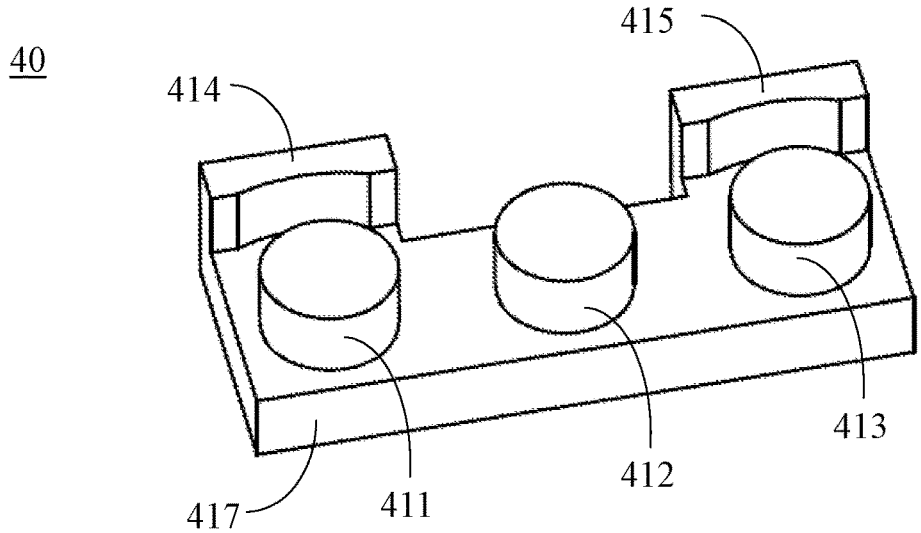
FIG. 4A illustrates a stereoscopic diagram of the third magnetic core structure of the magnetic component of the present disclosure, wherein the two side columns of the magnetic core structure are not on the same horizontal line as the three winding columns, and the two side columns are on the same side.
Figure 4B:
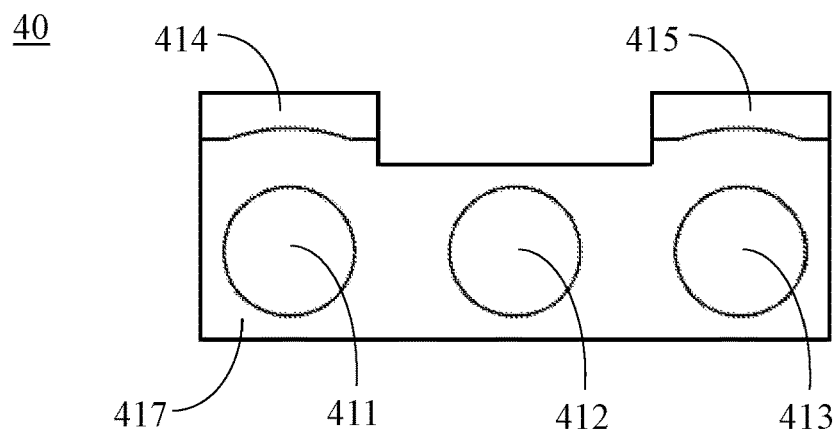
FIG. 4B illustrates a top view of the magnetic core structure shown in FIG. 4A.
Figure 4C:
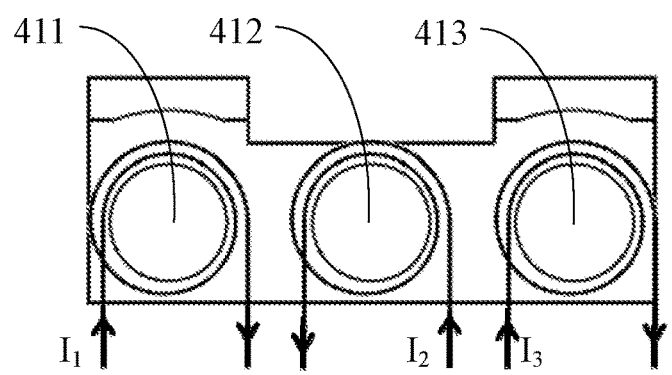
FIG. 4C illustrates current directions corresponding to the three winding columns of the magnetic core structure shown in FIG. 4A.

Referring to FIGS. 4A, 4B and 4C, FIG. 4A is a stereoscopic structure diagram of the third magnetic core structure 40 in the present disclosure. Besides including a first winding column 411, a second winding column 412, a third winding column 413, a first side column 414 and a second side column 415, the magnetic core structure 40 further includes a first cover plate (not shown) and a second cover plate 417 opposite to each other. The first cover plate and the second cover plate 417 are disposed respectively above and below the first winding column 411, the second winding column 412, the third winding column 413, the first side column 414 and the second side column 415 to form a closed magnetic flux loop. FIG. 4A illustrates a stereoscopic structure diagram of the magnetic core structure 40 after omitting the first cover plate, and FIG. 4B illustrates a top view of the magnetic core structure shown in FIG. 4A, wherein the three winding columns, such as, the first winding column 411, the second winding column 412 and the third winding column 413, of the magnetic core structure are sequentially arranged along a horizontal line, and the first side column 414 and the second side column 415 are disposed on the same side of the horizontal line. FIG. 4C illustrates current directions of the windings of the magnetic core structure shown in FIG. 4A. Current directions $I_1$ and $I_3$ of the first winding column 411 and the third winding column 413 are clockwise directions, and a current direction $I_2$ of the second winding column 412 is an counterclockwise direction.

Figure 5A:
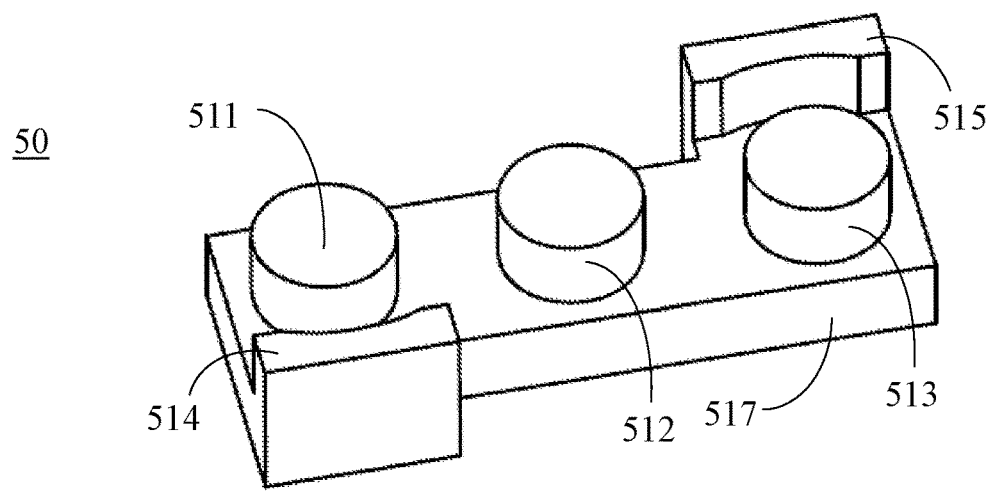
FIG. 5A illustrates a stereoscopic diagram of the fourth magnetic core structure of the magnetic component of the present disclosure, wherein the two side columns of the magnetic core structure are not on the same horizontal line as the three winding columns, and the two side columns are on different sides.
Figure 5B:
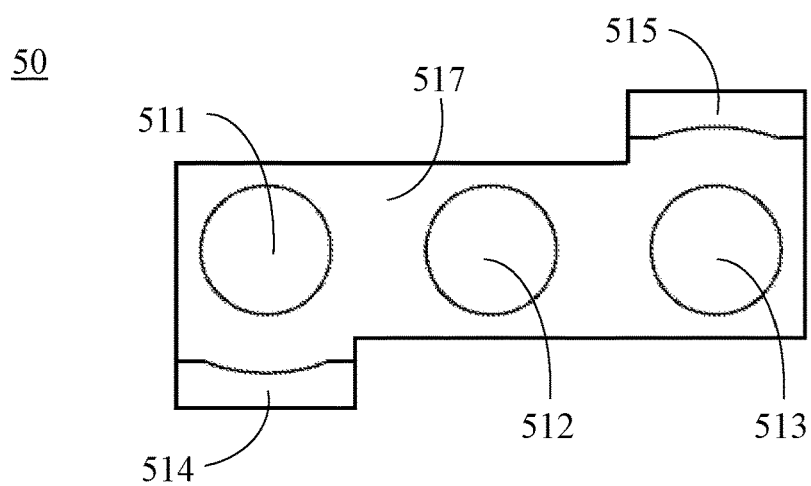
FIG. 5B illustrates a top view of the magnetic core structure shown in FIG. 5A.
Figure 5C:
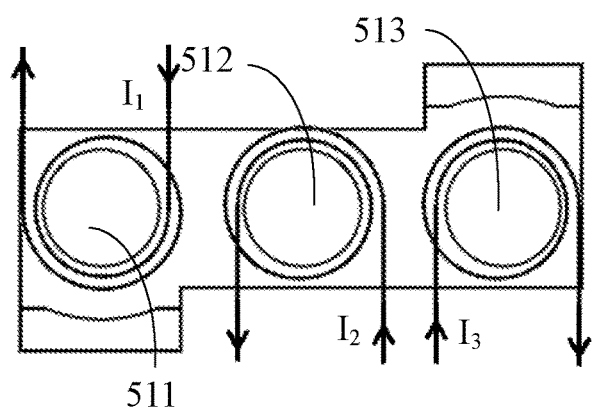
FIG. 5C illustrates current directions corresponding to the three winding columns of the magnetic core structure shown in FIG. 5A.

Referring to FIGS. 5A, 5B and 5C, FIG. 5A is a stereoscopic structure diagram of the fourth magnetic core structure in the present disclosure. Besides including a first winding column 511, a second winding column 512, a third winding column 513, a first side column 514 and a second side column 515, the magnetic core structure 50 further includes a first cover plate (not shown) and a second cover plate 517 opposite to each other. The first cover plate and the second cover plate 517 are disposed respectively above and below the first winding column 511, the second winding column 512, the third winding column 513, the first side column 514 and the second side column 515 to form a closed magnetic flux loop. FIG. 5A illustrates a stereoscopic structure diagram of the magnetic core structure after omitting the first cover plate, and FIG. 5B illustrates a top view of the magnetic core structure shown in FIG. 5A, wherein the three winding columns, such as, the first winding column 511, the second winding column 512 and the third winding column 513, of the magnetic core structure are sequentially arranged along a horizontal line, and the first side column 514 and the second side column 515 are disposed on different sides of the horizontal line, respectively. FIG. 5C illustrates current directions of the windings of the magnetic core structure shown in FIG. 5A. Current directions of $I_1$ and $I_3$ of the first winding column 511 and the third winding column 513 are clockwise directions, and a current direction $I_2$ of the second winding column 512 is an counterclockwise direction.

In one embodiment of the present disclosure, the magnetic core structures shown in FIGS. 3A-3G, 4A-4C and 5A-5C may be used to form the magnetic component shown in FIG. 2, i.e., a transformer integrated magnetic component (e.g., an array transformer), wherein the primary windings may be a PCB winding, triple insulated wire winding or other type of winding, and the secondary windings may be a PCB winding, a copper sheet winding or other type of winding. Moreover, two secondary windings are wound on each winding column of the magnetic component shown in FIG. 2, but the disclosure is not limited thereto. In other embodiment, only one secondary winding is wound on each winding column.

In other embodiment of the present disclosure, the magnetic component 20 shown in FIG. 2 also may not have secondary windings, and at this time, it may be used as an inductor, i.e., forming an inductor integrated magnetic component.

Although FIG. 2 only illustrates a transformer integrated magnetic component with three sub-transformers integrated onto one iron core. However, it can be understood that the present disclosure also may have other variations, such as, a transformer integrated magnetic component formed by integrating more sub-transformers, or such as, an inductor integrated magnetic component only formed by integrating more primary windings (i.e., without secondary windings). They are not used as a limit to the present disclosure.

Figure 6A:
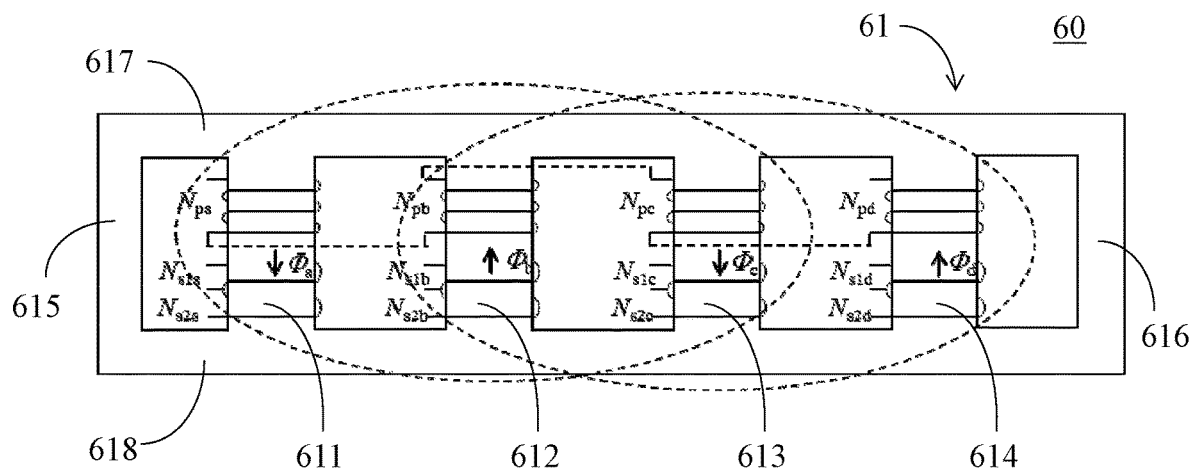
FIG. 6A illustrates a schematic diagram of structure of a transformer and connection of windings in another embodiment of the present disclosure, wherein the number of the winding columns is four.

Referring to FIGS. 6A, 6B, 6C and 6D, FIG. 6A illustrates a structure extending to a plurality of sub-transformers integrated onto one iron core on the basis of FIG. 2, such as, a transformer integrated magnetic component 60 consisting of four sub-transformers shown in FIG. 6A. The transformer integrated magnetic component 60 includes a magnetic core 61, and the magnetic core 61 includes a first side column 615, a first winding column 611, a second winding column 612, a third winding column 613, a fourth winding column 614 and a second side column 616 sequentially arranged in adjacent, and further includes a first cover plate 617 and a second cover plate 618 opposite to each other. The first cover plate 617 and the second cover plate 618 are disposed respectively above and below the first winding column 611, the second winding column 612, the third winding column 613, the fourth winding column 614, the first side column 615 and the second side column 616 to form a closed magnetic flux loop. Magnetic flux direction of the middle winding column in adjacent three winding columns is opposite to magnetic fluxes direction of the other two winding columns in adjacent three winding columns. For example, in the adjacent first winding column 611, the second winding column 612 and the third winding column 613, a magnetic flux $\Phi_b$ of the middle winding column (i.e., the second winding column 612) has a direction opposite to that of magnetic fluxes $\Phi_a$ and $\Phi_c$ of the first winding column 611 and the third winding column 613 on both sides, and in the adjacent second winding column 612, the third winding column 613 and the fourth winding column 614, a magnetic flux (I), of the middle winding column (i.e., the third winding column 613) has a direction opposite to that of magnetic fluxes $\Phi_b$ and $\Phi_d$ of the second winding column 612 and the fourth winding column 614 on both sides.

Figure 6B:
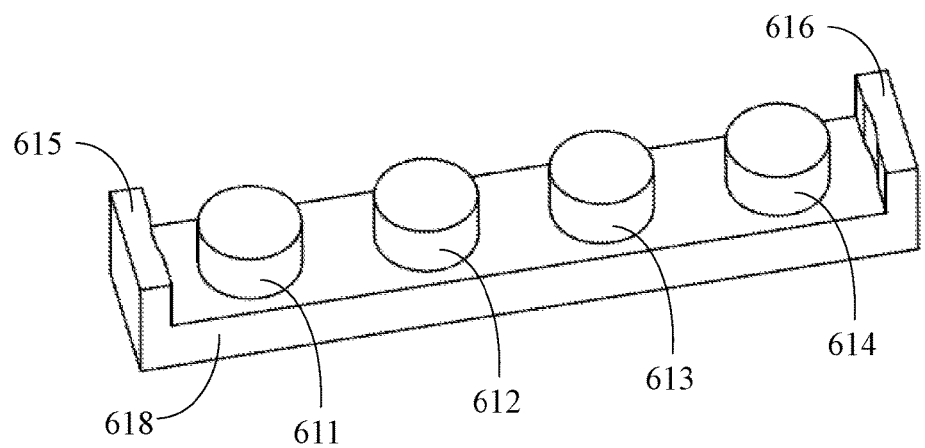
FIG. 6B illustrates a stereoscopic diagram of the magnetic core structure without the first cover plate of the transformer shown in FIG. 6A.
Figure 6C:
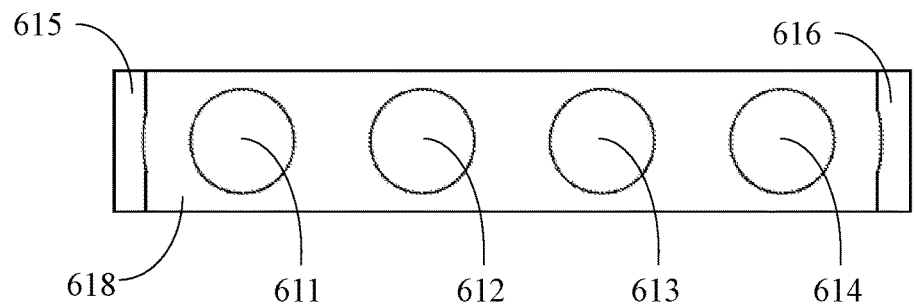
FIG. 6C illustrates a top view of the magnetic core structure shown in FIG. 6B.
Figure 6D:
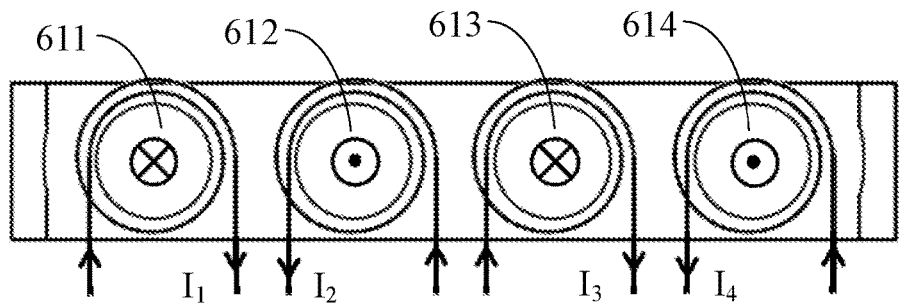
FIG. 6D illustrates current directions corresponding to the four winding columns of the magnetic core structure shown in FIG. 6B.

FIG. 6B illustrates a stereoscopic structure diagram of the magnetic core structure after omitting the first cover plate. FIG. 6C illustrates a top view of the magnetic core structure shown in FIG. 6B. The four winding columns, such as, the first winding column 611, the second winding column 612, the third winding column 613 and the fourth winding column 614, of the magnetic core 61 are sequentially arranged along a horizontal line, and the first side column 615 and the second side column 616 are disposed on both ends of the horizontal line, respectively. FIG. 6D illustrates current directions of the windings of the magnetic core structure shown in FIG. 6B, wherein current directions $I_1$ and $I_3$ of the first winding column 611 and the third winding column 613 are clockwise directions, and current directions $I_2$ and $I_4$ of the second winding column 612 and the fourth winding column 614 are counterclockwise directions. Similarly, in the embodiments shown in FIGS. 6A-6D, the primary windings may be PCB or triple insulated wire or other forms of windings, and the secondary windings may be PCB or copper sheet or other forms of windings. It also may not have secondary windings, and at this time, it may be used as an inductor.

Figure 7A:
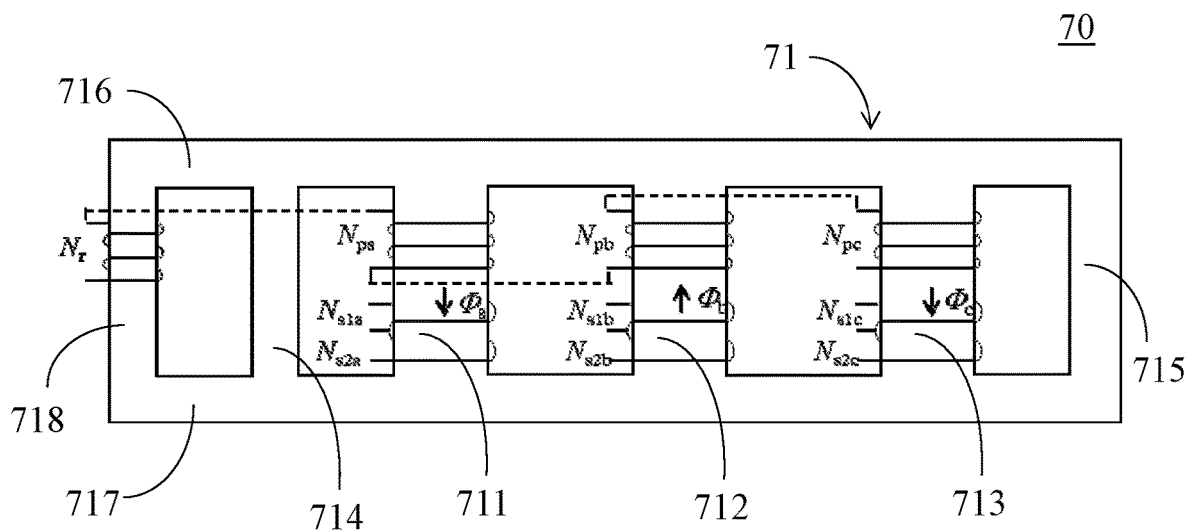
FIG. 7A illustrates a schematic diagram of the magnetic component adding one inductance winding column on the basis of FIG. 2.
Figure 7B:
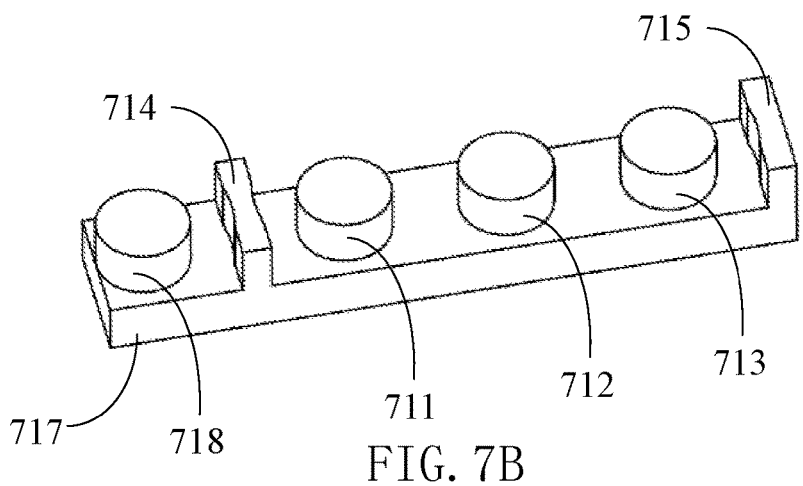
FIG. 7B illustrates a stereoscopic diagram of the magnetic core structure without the first cover plate in the magnetic component shown in FIG. 7A.
Figure 7C:
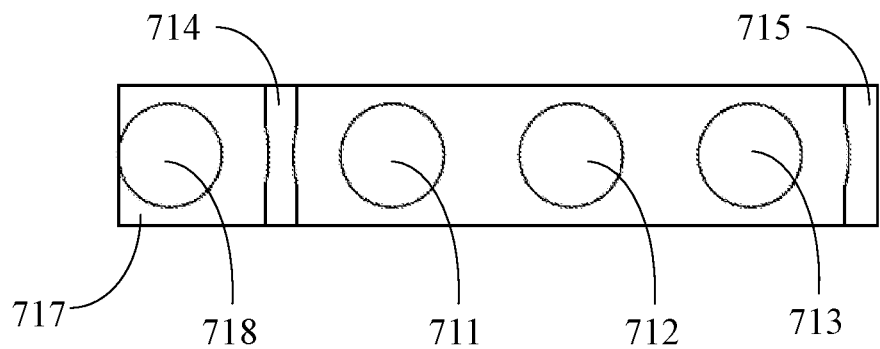
FIG. 7C illustrates a top view of the magnetic core structure shown in FIG. 7B.
Figure 7D:
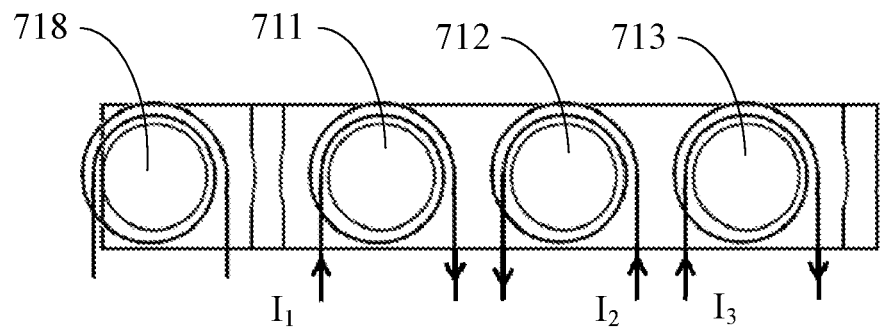
FIG. 7D illustrates current directions corresponding to the three winding columns of the magnetic core structure shown in FIG. 7B.

Referring to FIGS. 7A and 7B, which illustrate a structure of another magnetic component 70 in another embodiment of the present disclosure, and illustrate an embodiment of adding an inductance winding column on the left side of the first side column on the basis of FIG. 2. An inductor winding $N_r$ is wound on the inductance winding column to form a resonant inductor Lr of the LLC circuit in FIG. 1A. The embodiment is a magnetic integration manner in which the resonant inductor and the transformer share side columns. In this embodiment, the magnetic component 70 includes a magnetic core 71, and the magnetic core 71 includes an inductance winding column 718, a first side column 714, a first winding column 711, a second winding column 712, a third winding column 713 and a second side column 715 sequentially arranged in adjacent, and further includes a first cover plate 716 and a second cover plate 717 opposite to each other. The first cover plate 716 and the second cover plate 717 are disposed respectively above and below the first winding column 711, the second winding column 712, the third winding column 713, the inductance winding column 718, the first side column 714 and the second side column 715 to form a closed magnetic flux loop. Moreover, directions of magnetic fluxes $D_a$ and $\Phi_c$ on the first winding column 711 and the third winding column 713 are downwardly, a direction of a magnetic flux $\Phi_b$ on the second winding column 712 is upwardly, and a direction of a magnetic flux on the inductance winding column 718 may be upwardly, and also may be downwardly. FIG. 7B illustrates a stereoscopic structure diagram of the magnetic core structure after omitting the first cover plate, and FIG. 7C illustrates a top view of the magnetic core structure shown in FIG. 7B. The three winding columns, such as, the first winding column 711, the second winding column 712 and the third winding column 713, of the magnetic core 71 are sequentially arranged along a horizontal line, the first side column 714 and the second side column 715 are disposed on both ends of the horizontal line, respectively, and the inductance winding column 718 is outside one end of the first side column 714. In another embodiment, the inductance winding column 718 also may be outside one end of the second side column 715. FIG. 7D illustrates current directions of the windings of the magnetic core structure shown in FIG. 7B. Current directions $I_1$ and $I_3$ of the first winding column 711 and the third winding column 713 are clockwise directions, a current direction $I_2$ of the second winding column 712 is an counterclockwise direction, and a current direction of the winding corresponding to the inductance winding column may be a clockwise direction, and also may be an counterclockwise direction. Similarly, in the embodiments shown in FIGS. 7A-7D, the primary windings may be PCB or triple insulated wire or other forms of windings, and the secondary windings may be PCB or copper sheet or other forms of windings. It also may not have secondary windings, and it is used as an inductor.

The present disclosure can effectively reduce a size of the magnetic component by integrating a multipath inductor or transformer into the same magnetic component. In addition, by configuring that magnetic flux direction of the middle winding column in adjacent three winding columns is opposite to magnetic fluxes direction of the other two winding columns in adjacent three winding columns, loss of the magnetic core is effectively reduced.

In the present disclosure, the shape of the winding columns illustrated above is not limited to a cylinder shown in the drawings, and also may be various shapes, such as, a polygon, a racetrack, an oval and the like. Moreover, in the present disclosure, cross sections of these winding columns are substantially the same, which means a difference within 5%, especially within 3%. As for the same magnetic flux, it means that a difference of magnetic fluxes is no more than 5%, especially no more than 3%.

Furthermore, in the present disclosure, preferably, inner sides of the first side column and the second side column also may be provided with outer contour corresponding parts (not shown) corresponding to outer contours of the corresponding winding columns, such as, arc concave parts corresponding to outer contours of the cylindrical winding columns. An outer side of the first side column or the second side column also may be provided with an inductance outer contour corresponding part corresponding to an outer contour of the corresponding inductance winding column (e.g., please refer to FIGS. 7B and 7C).

The exemplary embodiments of the present disclosure are specifically illustrated and described above. It shall be understood that the present disclosure is not limited to the disclosed embodiments. On the contrary, the present disclosure is intended to cover various modifications and equivalent arrangements included in the spirit and scope of the appended claims.

What is claimed is:

1. A switch power supply device, comprising:
    a magnetic component comprising:
        a magnetic core, having a first winding column, a second winding column, a third winding column, a first side column, a second side column, and a first cover plate and a second cover plate which are disposed opposite to each other, wherein the second winding column is disposed between the first winding column and the third winding column, the first side column and the second side column are disposed respectively outside the first winding column and the third winding column, the first cover plate and the second cover plate are disposed respectively above and below the first winding column, the second winding column, the third winding column, the first side column and the second side column, the first cover plate is connected to an upper end of each of the first winding column, the second winding column, the third winding column, the first side column, and the second side column, the second cover plate is connected to a lower end of each of the first winding column, the second winding column, the third winding column, the first side column, and the second side column, to form a closed magnetic flux loop, and wherein a magnetic flux of the first winding column and a magnetic flux of the third winding column have a first direction, and a magnetic flux of the second winding column has a second direction opposite to the first direction, and wherein, in a plane where the magnetic core is located, there is a straight line simultaneously contacts with or penetrates through the first winding column, the second winding column, and the third winding column;
    a primary circuit for receiving an input voltage, and converting the input voltage into a primary voltage;
    an isolation conversion module for converting the primary voltage into a secondary voltage, comprising:
        a first transformer comprising a first primary winding, a first secondary winding and a second secondary winding;
        a second transformer comprising a second primary winding, a third secondary winding and a fourth secondary winding; and
        a third transformer comprising a third primary winding, a fifth secondary winding and a sixth secondary winding; and
    a secondary circuit for converting the secondary voltage into an output voltage;
    wherein the first primary winding, the first secondary winding and the second secondary winding are wound on the first winding column, the second primary winding, the third secondary winding and the fourth secondary winding are wound on the second winding column, and the third primary winding, the fifth secondary winding and the sixth secondary winding are wound on the third winding column.

2. The switch power supply device of claim 1, wherein the first secondary winding is connected to the second secondary winding in series, a first end of the first secondary winding is electrically coupled to a first output terminal via a first switch, a second end of the second secondary winding is electrically coupled to the first output terminal via a second switch, and a second end of the first secondary winding and a first end of the second secondary winding are connected and electrically coupled to a second output terminal;
    wherein the third secondary winding is connected to the fourth secondary winding in series, a first end of the third secondary winding is electrically coupled to the first output terminal via a third switch, a second end of the fourth secondary winding is electrically coupled to the first output terminal via a fourth switch, and a second end of the third secondary winding and a first end of the fourth secondary winding are connected and electrically coupled to the second output terminal;
    wherein the fifth secondary winding is connected to the sixth secondary winding in series, a first end of the fifth secondary winding is electrically coupled to the first output terminal via a fifth switch, a second end of the sixth secondary winding is electrically coupled to the first output terminal via a sixth switch, and a second end of the fifth secondary winding and a first end of the sixth secondary winding are connected and electrically coupled to the second output terminal.

3. The switch power supply device of claim 1, wherein:
    a first end of the first primary winding is electrically coupled to one end of the primary circuit;
    a first end of the second primary winding is electrically coupled to a second end of the first primary winding; and
    a first end of the third primary winding is electrically coupled to a second end of the second primary winding, and a second end of the third primary winding is electrically coupled to the other end of the primary circuit.

4. The switch power supply device of claim 1, wherein the first primary winding, the second primary winding and the third primary winding are PCB windings or triple insulated wire windings.

5. The switch power supply device of claim 1, wherein the number of turns of each of the first secondary winding, the second secondary winding, the third secondary winding, the fourth secondary winding, the fifth secondary winding and the sixth secondary winding is one.

6. The switch power supply device of claim 1, wherein the first secondary winding, the second secondary winding, the third secondary winding, the fourth secondary winding, the fifth secondary winding and the sixth secondary winding are PCB windings or copper sheet windings.

7. The switch power supply device of claim 1, wherein the input voltage is in a range from 300V to 450V.

8. The switch power supply device of claim 1, wherein the input voltage is in a range from 36V to 72V.

* * * * *